(12) United States Patent
Bilgram et al.

(10) Patent No.: US 8,434,365 B2
(45) Date of Patent: May 7, 2013

(54) AERODYNAMIC PROFILE FOR AIRCRAFT AND WIND POWER STATIONS AND METHOD OF MEASURING THE THICKNESS OF ICE ON AN AERODYNAMIC PROFILE

(75) Inventors: Rudolf Bilgram, Taufkirchen (DE);
Christian Gradolph, Unterhaching (DE); Alois Friedberger, Glonn (DE); Valentin Kloeppel, Munich (DE)

(73) Assignee: Airbus Operations GmbH, Hamburg (DE)

( * ) Notice: Subject to any disclaimer, the term of this patent is extended or adjusted under 35 U.S.C. 154(b) by 987 days.

(21) Appl. No.: 12/280,770

(22) PCT Filed: Feb. 26, 2007

(86) PCT No.: PCT/DE2007/000353
§ 371 (c)(1),
(2), (4) Date: Jan. 8, 2009

(87) PCT Pub. No.: WO2007/095935
PCT Pub. Date: Aug. 30, 2007

(65) Prior Publication Data
US 2009/0189020 A1    Jul. 30, 2009

(30) Foreign Application Priority Data

Feb. 27, 2006   (DE) .......................... 10 2006 009 480

(51) Int. Cl.
*G01N 29/07* (2006.01)
*G01K 11/24* (2006.01)

(52) U.S. Cl.
USPC ............ 73/597; 73/170.26; 374/119; 416/39; 416/61

(58) Field of Classification Search ............ 73/597–598, 73/170.01–170.26; 416/1, 61, 39, 224, 229 R, 416/230; 374/16, 27, 28, 117–119, 100, 374/109, 141
See application file for complete search history.

(56) References Cited

U.S. PATENT DOCUMENTS

| | | | |
|---|---|---|---|
| 4,628,736 A | 12/1986 | Kirby et al. | |
| 5,095,754 A | 3/1992 | Hsu et al. | |

(Continued)

FOREIGN PATENT DOCUMENTS

| | | | |
|---|---|---|---|
| DE | 695 31 315 T2 | 5/2004 | |
| EP | 0 393 960 A1 | 10/1990 | |

(Continued)

OTHER PUBLICATIONS

International Search Report dated Aug. 27, 2007 including English translation of the relevant portion (Six (6) pages).

(Continued)

*Primary Examiner* — Peter Macchiarolo
*Assistant Examiner* — Rose M Miller
(74) *Attorney, Agent, or Firm* — Crowell & Moring LLP

(57) ABSTRACT

An aerodynamically shaped profile member for aircraft and wind power stations includes, for example, phased-array ultrasonic generator arrangement arranged therein. During operation of the profile member, the ultrasonic generator emits ultrasonic waves in a targeted manner in multiple directions to determine a profile of the thickness of an ice layer on the surface of the aerodynamic profile. The structure may be, for example, a composite fiber material arranged around a foam core, with the ultrasonic generator arrangement being laminated into the composite fiber material. For measurement of the ice thickness, ultrasonic waves are transmitted in a targeted manner to different positions of the surface of the aerodynamic profile, and the ultrasonic waves reflected on the interfaces of the ice layer are detected. At least one region of the surface is scanned by means of the targeted ultrasonic waves, to determine an ice thickness profile.

6 Claims, 3 Drawing Sheets

U.S. PATENT DOCUMENTS

| | | | |
|---|---|---|---|
| 5,507,183 | A | 4/1996 | Larue et al. |
| 5,629,485 | A * | 5/1997 | Rose et al. ...................... 73/599 |
| 6,076,405 | A | 6/2000 | Schoess |
| 2003/0169186 | A1 | 9/2003 | Vopat |
| 2005/0016278 | A1 * | 1/2005 | Knowles et al. ................ 73/592 |
| 2009/0224104 | A1 * | 9/2009 | Tenebre et al. ........... 244/134 R |

FOREIGN PATENT DOCUMENTS

| | | |
|---|---|---|
| EP | 1 017 061 A1 | 7/2000 |
| EP | 1 336 564 A2 | 8/2003 |
| WO | WO 94/20819 A1 | 9/1994 |

OTHER PUBLICATIONS

Form PCT/ISA/237 with English translation (Nine (9) pages), Mailed Aug. 27, 2007.

International Preliminary Report on Patentability (fourteen (14) pages) with an English translation, Mailed Aug. 27, 2007.

* cited by examiner ative of the present invention to permit an
AERODYNAMIC PROFILE FOR AIRCRAFT AND WIND POWER STATIONS AND METHOD OF MEASURING THE THICKNESS OF ICE ON AN AERODYNAMIC PROFILE This application is a national stage of International Application No. PCT/EPDE2007/000353, filed Feb. 26, 2007, which claims priority under 35 U.S.C. §119 to German Patent Application No. 10 2006 009 480.8, filed Feb. 27, 2006, the entire disclosure of which is herein expressly incorporated by reference.

BACKGROUND AND SUMMARY OF THE INVENTION

The present invention relates to an aerodynamic profile for aircraft and wind power stations, and to a method of measuring the thickness of ice on such an aerodynamic profile.

Aerodynamic profiles, such as rotor blades of helicopters and wind power stations (and also wings of airplanes) are subject to the formation of ice on their surface. Uneven ice shapes, for example in the form of ice noses, are particularly dangerous because the air current is more likely to stall here than in the case of a uniform thick and smooth ice layer. FIG. 2 illustrates the leading edge 7 of an aerodynamic profile with a non-uniform ice layer 8 thereon, which can easily lead to a stall.

In order to counteract the general problem of the icing of aerodynamic profiles, it is necessary to be able to detect the ice layer, and to measure its thickness. However, for more extensive investigations of ice formation and to avoid safety risks, not only the thickness of the ice layer but also its shape the aerodynamic profile should be measured. For this purpose, in the past the formed ice has been sawn after a flight through the icing region, and its shape has been measured. As an alternative, there has been the possibility of mounting riders with optical markings on the wing or a rotor blade, which riders are observed by a camera in order to be able follow the process of monitoring the markings by the ice that is being added.

Various documents describe the use of ultrasound for the detection of ice on wings or aerodynamic profiles. However, the known methods are limited to detecting the ice and measuring its thickness by individual transducers. The shape of the ice on the wing is not measured.

In this context, U.S. Pat. No. 4,628,736 describes a method and apparatus for measuring the thickness of ice by means of ultrasound, in which an ultrasonic pulse is emitted by a transducer or ultrasonic generator situated on the surface in the region of the leading edge of the wing. The ultrasonic pulse extends through the ice to its surface where it is reflected and received again at the ultrasonic generator. The thickness of the ice is determined from the transit time of the pulse.

U.S. Pat. No. 5,095,754 describes a similar method of determining the thickness of ice, but the sound generator is arranged on the underside of a buffer block whose surface is arranged in the plane of the actual ice accumulation surface.

Furthermore, U.S. Pat. No. 5,507,183 shows a method and apparatus for detecting of ice on the surface of a structure, such as a wing, in which ultrasonic waves originating from an ultrasonic generator are transmitted in the direction of the surface of the wing and, after the reflection at the interfaces of the ice layer situated thereon, are received at an ultrasonic receiver.

However, the measures for detecting ice on aerodynamic profiles known so far have the disadvantage that they cannot determine the shape of the ice. Furthermore, high construction expenditures are required for installing the known measuring devices into the wings or profiles.

It is therefore an object of the present invention to permit an online measurement of the shape of the ice on aerodynamic profiles without mounting additional components which impede the flow.

This and other objects and advantages are achieved by the method and apparatus according to the invention, which comprises an aerodynamically shaped structure and a phased array controlled ultrasonic generator arrangement which is arranged within the aerodynamic profile. During operation, the ultrasonic generator emits ultrasonic waves in a targeted manner in different directions in order to determine the profile of the thickness of a ice layer on the surface of the aerodynamic profile. As a result of the invention, an online measurement of the ice profile becomes possible without mounting additional components on the rotor blade or the wing, which components impede the flow. During a flight, a profile of the ice layer on an airplane wing or on a rotor blade of a helicopter can thus be determined. In the case of wind power stations, the profile of the ice thickness on the rotor blade can be determined and observed in real time. By observing the ice profile during the flight or the operation, appropriate measures can rapidly be taken as soon as the form of the ice layer assumes a shape which may, for example, result in a stall.

The ultrasonic generator arrangement is preferably a phased array and/or comprises an array of ultrasonic generators.

The invention makes it is also possible to determine the planar ice distribution on the aerodynamic profile, in order to calibrate codes for the icing simulation. This is necessary, for example, for flight tests.

Another advantage of the invention is the fact that no sensors are arranged on the surface of the aerodynamic profile so that no disturbances or failures or damaging of the sensors can take place by abrasion, erosion, etc.

The ultrasonic generator arrangement is advantageously further developed for carrying out a scan of the ice cover. The thickness of the ice profile can therefore be determined particularly rapidly.

Preferably, the ultrasonic generator arrangement is laminated into an aerodynamically shaped structure which is made, for example, of a composite fiber material. As a result, the ultrasonic generators are particularly protected, and the construction expenditures and thereby the costs are simultaneously reduced.

As an alternative, the ultrasonic generator arrangement may also be arranged outside the region made of composite fiber material, for example, between a foam core of the aerodynamic profile and the adjoining composite fiber material or inside the foam core. This has the advantage that the ultrasonic generator arrangement can be fitted in a particularly simple manner, and no laminating-in is required. Furthermore, the fiber structure or the carbon fiber structure is not disturbed by the ultrasonic generator arrangement.

The ultrasonic generator arrangement may, for example, be in the form of a one-dimensional embodiment; That is, it may comprise a series of successively arranged ultrasonic generator elements. As a result, a scan of the deposited ice layer on the aerodynamic profile can be carried out even by means of a relatively small number of ultrasonic generator elements.

The ultrasonic generator arrangement may also be in the form of a two-dimensional embodiment; That is, it may comprise a plurality of ultrasonic generator elements which are arranged in a planar fashion or in a plane. In this manner, it becomes possible to scan a planar area of the ice layer, so that a two-dimensional profile of the deposited ice layer can be created almost in real time. This means that the profile of the thickness of the ice can be determined in two directions, and a model can thereby be prepared of the ice layer deposited on the aerodynamic profile.

The ultrasonic generator arrangement comprises, for example, a number of piezo transducer elements, which can be implemented particularly in the form of a PVDF foil or other ultrasound-emitting flexible substrates.

Furthermore, the piezo transducer elements can be arranged below an erosion protector of the aerodynamic profile. As a result the individual elements automatically emit wave fronts perpendicular to the surface of the aerodynamic profile. The piezo transducer elements are then, for example, not operated as a phased-array ultrasonic generator arrangement but are individually controlled. That is, the thickness of the ice is measured locally at each piezo transducer element, and, as a result of their planar composite action, the elements, in turn, allow the two-dimensional measurement of the ice profile.

The aerodynamic profile may be a rotor blade for a helicopter or for a wind power station, or it may be a wing of an airplane.

According to another aspect of the invention, a method of measuring the thickness of ice on an aerodynamic profile includes the steps of: Emitting ultrasonic waves to the surface of the aerodynamic profile; receiving the ultrasonic waves reflected at the interfaces of an ice layer; determining the thickness of the layer of ice by analyzing the transit time of the reflected ultrasonic waves within the ice layer or by analyzing interferences. The ultrasonic waves are transmitted in a targeted manner to various positions of the surface of the aerodynamic profile, and at least one region of the surface is scanned by means of the targeted ultrasonic waves in order to determine the profile of the thickness of the ice.

The method according to the invention essentially has the same advantages as the aerodynamic profile.

The profile of the thickness of the ice is preferably determined from the transit time of the ultrasonic waves reflected back at interface of the ice layer. If the transit time through the wing is too short compared to the time which the piezo elements require for switching between the transmitting and receiving modes, an additional layer can be inserted between the wing and the piezo element which decelerates the sound propagation. Furthermore, this layer may be implemented by means of flexible substances and, with respect to the acoustic impedance, may be adapted such that as much sound energy as possible changes over into the wing and into the ice layer. Simultaneously, the received signal can be analyzed by the interface of this deceleration layer as a reference signal in order to compensate temperature-caused effects and additional interfering effects.

The profile of the thickness of the ice can be determined by analysis of interferences of the ultrasonic waves reflected and superimposed on at least two interfaces at the ice layer.

The wave fronts of the ultrasonic waves advantageously impinge essentially perpendicularly on the surface of the aerodynamic profile.

Other objects, advantages and novel features of the present invention will become apparent from the following detailed description of the invention when considered in conjunction with the accompanying drawings.

DETAILED DESCRIPTION OF THE DRAWINGS

Figure 1:
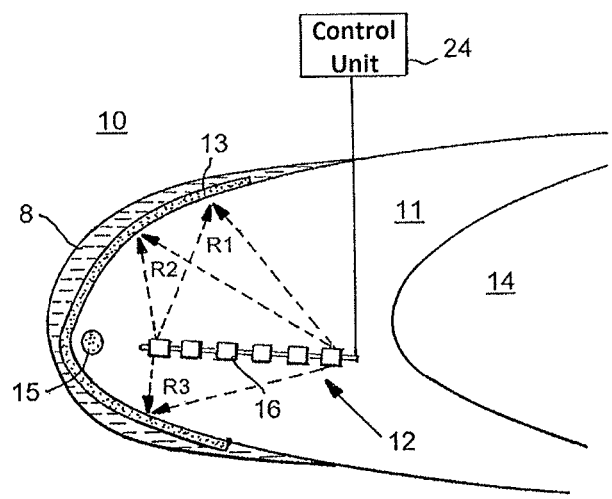
FIG. 1 is a schematic cross-sectional view of an aerodynamic profile according to a first preferred embodiment of the invention.
Figure 2:
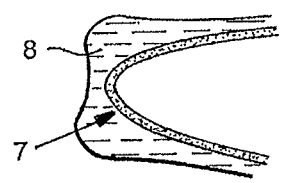
FIG. 2 is a schematic view of an example of an ice shape on the rotor blade or the airplane wing.

FIG. 1 is a sectional view of an aerodynamic profile 10 according to a first preferred embodiment of the invention. (For the sake of simplicity, only the forward part of the aerodynamic profile 10 is illustrated). The aerodynamic profile 10, which may be for example, a rotor blade or an airplane wing, comprises an aerodynamically shaped structure 11 which, in the embodiment illustrated here, is made of a carbon fiber composite material. A phased array ultrasonic generator arranged inside the structure 11 emits ultrasonic waves in a targeted manner in different directions R1, R2, R3 in order to determine the profile of the thickness of an ice layer 8 deposited on the surface of the aerodynamic profile 10.

In the illustrated example, an erosion protector 13, which is arranged as a protective layer against abrasion and erosion on the structure 11, is situated at the leading edge of the aerodynamic profile 10. This means that a deposit of ice, which usually occurs in the area of the leading edge, takes place on the erosion protector 13.

In addition, a foam core 14 is arranged in the aerodynamic profile 10, with the structure 11 made of a composite fiber material surrounding the core 14. In the case of the rotor blade shown here, a lead core 15 is situated in the region of the leading edge of the aerodynamic profile 10.

The phased array ultrasonic generator arrangement 12 comprises a series of successively arranged ultrasonic generator elements 16, which extends within the structure 11 essentially in a direction from the leading edge 10a of the aerodynamic profile 10 toward its center. That is, in the case of a helicopter rotor blade or an airplane wing, the array extends in the horizontal direction (in the direction of the depth of the blade). The ultrasonic generator arrangement 12 is coupled to a control and analysis unit 24 (not shown) which controls the ultrasonic generator arrangement and analyzes the measuring signals during operation.

Figure 5:
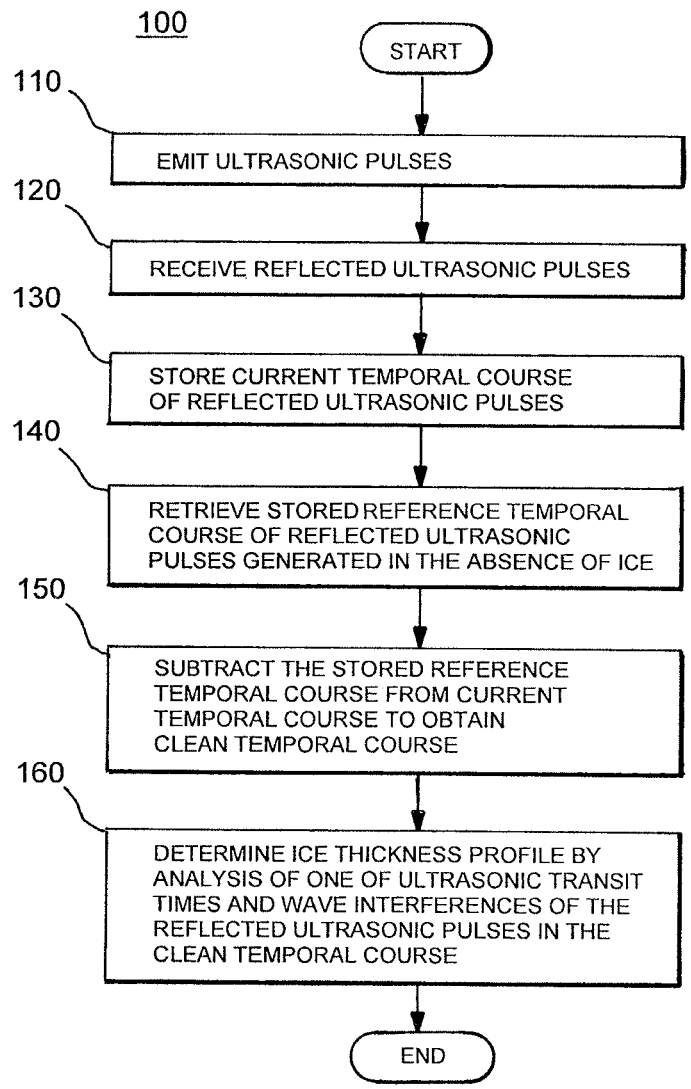
FIG. 5 is a flow chart of an embodiment of the method of the present invention.

To determine the profile of the thickness of the ice during operation (FIG. 5, method 100), the surface of the aerodynamic profile 10 is scanned by electrically controlling the propagation direction of the emitted wave front (step 110). At each scanning point, the ice thickness is measured by means of the ultrasonic waves reflected from there (step 120). Thus, a locally defined ice thickness measurement takes place, and an ice profile is generated.

The thickness of the ice is measured, for example, based on the transit time of the ultrasonic waves emitted by the ultrasonic generator arrangement 12 and reflected at the respective point of the surface of the aerodynamic profile 10. In this case, that fraction of the measuring signal is analyzed that is reflected at the interfaces between the surface of the aerodynamic profile 10 and the ice layer 8 as well as at the interface between the ice and the air (step 160). However, as an alternative, the thickness of the ice can also be measured in a different manner, for example, by the analysis of interferences which arise when the wave reflected at the profile surface/ice interface is superimposed with the wave reflected at the ice/air interface.

The ultrasonic generator arrangement receives not only the desired ultrasonic pulse of the wave reflected at the interface between ice and air but also numerous interference pulses by reflections, for example, at the erosion protector. To differentiate more easily the pulse that is of interest from the other pulses, the signals received by the ultrasonic generator arrangement can be stored during the operation under environmental conditions in which no ice can occur (step 130). During the measurement in the presence of ice, the previously stored signal is subtracted from the temporal course of the sensor amplitude (steps 140, 150), whereby many interfering effects can be eliminated.

As a result of the "horizontal" arrangement of the phased-array ultrasonic generator in the rotor blade or in the wing (illustrated here), the reflected waves can be detected from almost all positions in the relevant range again by means of the ultrasonic generator arrangement 12. It is only in the area of the lead core 15 (that is, in the extension of the axis of the piezo transducer elements) that no measuring of the thickness of the ice can take place. During the measurement, the ultrasonic waves impinge essentially perpendicularly on the surface of the aerodynamic profile 10 and there enter into the ice deposited on the surface, so that optimal measuring results are achieved.

The phased-array ultrasonic generator arrangement is placed in position when the composite material is laminated during manufacturing of the aerodynamic profile. The composite material comprises particularly unidirectional glass fibers or carbon fibers which are provided in a rotor blade, for absorbing centrifugal forces. Materials having a high Curie temperature are used for the ultrasonic generator arrangement 12 in order to avoid damage caused by possibly high laminating temperatures.

Figure 3:
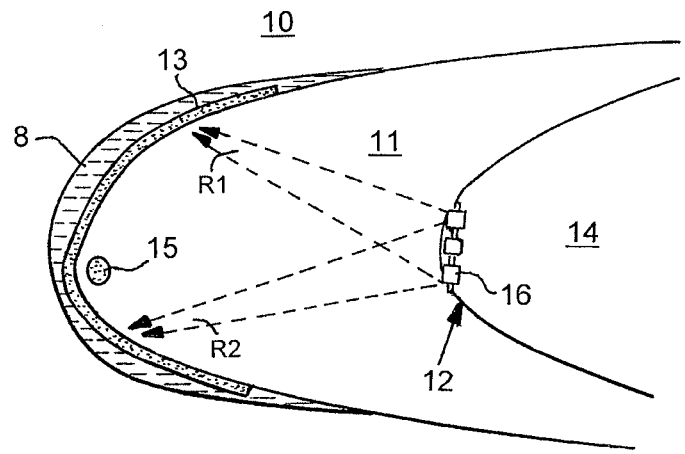
FIG. 3 is a schematic cross-sectional view of an aerodynamic profile according to a second preferred embodiment of the invention.

FIG. 3 illustrates another preferred embodiment of the invention in which the phased-array ultrasonic generator arrangement 12 with the individual phased-array ultrasonic generator elements 16 is arranged between the foam core or the core 14 and the carbon fiber composite material (that is, the structure 11); rather than being laminated in the region of the structure 11 made of a composite fiber material. Otherwise, the same reference numbers are used as in FIG. 1.

The ultrasonic generator arrangement 12 extends in the direction from the top side of the aerodynamic profile 10 to its underside. That is, in the case of a wing or a helicopter rotor blade, it is in the vertical direction (perpendicular to the direction of the blade depth). During the scanning of the ice layer 8 on the leading edge of the aerodynamic profile 10 (that is, on the erosion protector 13), the wave fronts are transmitted, originating from the phased-array ultrasonic generator arrangement 12, in a targeted manner successively to different points of the surface of the aerodynamic profile 10 and are reflected back from the interfaces of the ice layer 8 situated at these points. The ultrasonic generator arrangement 12, in turn, detects the reflected-back ultrasonic waves and feeds the measuring signals to the control and analysis unit not shown in the figure. The scanning of the ice layer 8 and the creation of the ice profile on the surface of the aerodynamic profile 10 takes place in this manner.

Figure 4:
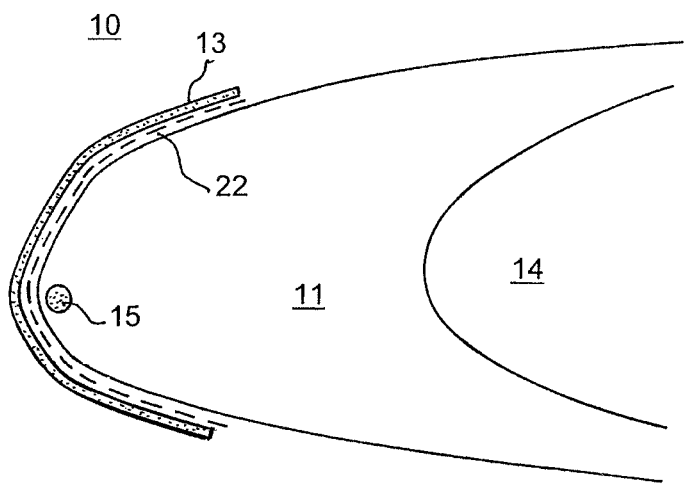
FIG. 4 is a schematic cross-sectional view of an aerodynamic profile according to a third preferred embodiment of the invention.

FIG. 4 illustrates another embodiment of the invention in which a piezo transducer array 22 (that is, an arrangement of piezo so nic generator elements) is arranged directly beneath the erosion protector 13, for example, in the form of a PVDF foil. This means that the ultrasonic generator arrangement in the form of a piezo transducer array is situated between the aerodynamic structure 11 made of a fiber composite material and the erosion protector 13 on the leading edge of the rotor blade or of the wing. As a result of the arrangement of the PVDF foil directly below the erosion protector 13, the emitted wave fronts automatically impinge perpendicularly on the surface of the aerodynamic profile 10. The additional elements illustrated in FIG. 4 are provided with the same reference numbers as in FIGS. 1 and 3 to which reference is made with respect to characteristics and functions.

In all embodiments illustrated here, one-dimensional phased-array ultrasonic generator arrangements as well as two-dimensional phased-array ultrasonic generator arrangements can be used. As a result, the ice profile can be determined not only at a cross-sectional position but also at a narrow distance perpendicular thereto as long as the wave front impinges approximately perpendicularly on the surface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An aerodynamically shaped profile member for aircraft and wind power stations, said profile member comprising:
an aerodynamically shaped profile member body; and
an ultrasonic generator arrangement arranged in an interior space of the aerodynamically shaped profile member body,
wherein:
the ultrasonic generator arrangement is configured to emit ultrasonic waves in a targeted manner in multiple directions to determine the profile of the thickness of an ice layer on the surface of the aerodynamic profile,
the ultrasonic generator arrangement comprises a plurality of piezo transducer elements located underneath an erosion protector of the aerodynamically shaped profile member body,
the aerodynamically shaped profile member body is made at least in part from a fiber composite material; and
the ultrasonic generator arrangement is laminated into the fiber composite material.

2. An aerodynamically shaped profile member for aircraft and wind power stations, said profile member comprising:
an aerodynamically shaped profile member body; and
an ultrasonic generator arrangement arranged in an interior space of the aerodynamically shaped profile member body,
wherein:
the ultrasonic generator arrangement is configured to emit ultrasonic waves in a targeted manner in multiple directions to determine the profile of the thickness of an ice layer on the surface of the aerodynamic profile,
the ultrasonic generator arrangement comprises a plurality of piezo transducer elements located underneath an erosion protector of the aerodynamically shaped profile member body,
the aerodynamically shaped profile member body is made in part from a fiber composite material; and
the ultrasonic generator arrangement is arranged outside a region of the aerodynamically shaped profile member body made of fiber composite material.

3. An aerodynamically shaped profile member for aircraft and wind power stations, said profile member comprising:
an aerodynamically shaped profile member body; and an ultrasonic generator arrangement arranged in an interior space of the aerodynamically shaped profile member body, wherein:

the ultrasonic generator arrangement is configured to emit ultrasonic waves in a targeted manner in multiple directions to determine the profile of the thickness of an ice layer on the surface of the aerodynamic profile, the ultrasonic generator arrangement comprises a plurality of piezo transducer elements located underneath an erosion protector of the aerodynamically shaped profile member body, and the ultrasonic generator arrangement is a phased-array arrangement.

4. An aerodynamically shaped profile member for aircraft and wind power stations said profile member comprising:

an aerodynamically shaped profile member body; and an ultrasonic generator arrangement arranged in an interior space of the aerodynamically shaped profile member body, wherein:

the ultrasonic generator arrangement is configured to emit ultrasonic waves in a targeted manner in multiple directions to determine the profile of the thickness of an ice layer on the surface of the aerodynamic profile, and the ultrasonic generator arrangement comprises a plurality of piezo transducer elements arranged as an at least two-dimensional array located underneath an erosion protector of the aerodynamically shaped profile member body.

5. A method of measuring a thickness of ice on an aerodynamic profile, the method comprising:

emitting ultrasonic waves to a surface of the aerodynamic profile;

receiving ultrasonic waves reflected at the interfaces of an ice layer; and determining the thickness of the ice layer by one of i) analyzing transit times of the reflected ultrasonic waves within the ice layer, and ii) analyzing interferences between the reflected ultrasonic waves;

wherein the ultrasonic waves are transmitted in a targeted manner to different positions of the surface of the aerodynamic profile;

at least one region of the surface is scanned by the targeted ultrasonic waves to determine an ice thickness profile; and an ice thickness profile is determined by analyzing interferences between the ultrasonic waves reflected from at least two interfaces of the ice layer.

6. A method of measuring the thickness of ice on an aerodynamic profile, said method comprising:

emitting ultrasonic waves to a surface of the aerodynamic profile, wherein the ultrasonic waves are transmitted in a targeted manner to different positions of the surface of the aerodynamic profile from an ultrasonic wave emitter;

receiving ultrasonic waves reflected at interfaces of an ice layer;

determining the thickness of the ice layer by one of i) analyzing transit times of the reflected ultrasonic waves within the ice layer, and ii) analyzing interferences between the reflected ultrasonic waves;

making a reference measurement using ultrasonic waves of a temporal course of the ultrasonic waves between the ultrasonic wave emitter and the surface of the aerodynamic profile in the absence of ice; and storing the temporal course of the ultrasonic waves in the absence of ice;

wherein the determining of the thickness of the ice layer includes subtracting the stored temporal course in the absence of ice from the received ultrasonic waves reflected from the ice layer interfaces to minimize an influence of reflections from surfaces measured in the absence of ice.

* * * * *